United States Patent [19]
Ferragina

[11] Patent Number: 5,550,448
[45] Date of Patent: Aug. 27, 1996

[54] METHOD AND APPARATUS FOR CONTROLLING THE MOVEMENT OF A TOOL

[75] Inventor: Rosario Ferragina, Lipomo, Italy

[73] Assignee: Black & Decker Inc., Newark, Del.

[21] Appl. No.: 277,462

[22] Filed: Jul. 20, 1994

[30] Foreign Application Priority Data

Jul. 20, 1993 [IT] Italy .................... MI93A1597

[51] Int. Cl.$^6$ .................................. G05B 19/416
[52] U.S. Cl. .................. 318/569; 318/574; 318/625; 318/685
[58] Field of Search ................. 318/567, 568.1, 318/569, 570, 571, 574, 600, 601, 603, 617, 618, 685, 696, 625

[56] References Cited

U.S. PATENT DOCUMENTS

| 3,932,796 | 1/1976 | Kreithen et al. |
| 4,348,731 | 9/1982 | Kogawa |
| 4,623,971 | 11/1986 | Ailman et al. |

FOREIGN PATENT DOCUMENTS

| 0268491 | 11/1987 | European Pat. Off. |
| 0299080 | 1/1988 | European Pat. Off. |
| 0440805 | 8/1990 | European Pat. Off. |
| 2195409 | 1/1989 | Japan. |

*Primary Examiner*—Bentsu Ro
*Attorney, Agent, or Firm*—Charles E. Yocum; Dennis A. Dearing; Frederick H. Voss

[57] ABSTRACT

A method and an apparatus for controlling the motors for moving a tool, comprising a control cycle with the steps of calculating first and second parameters indicating the speed to be imparted to the motors to travel at a pre-established nominal speed along first and second segments sequential to each other, and of calculating the absolute value of the difference between first and second parameters. If the difference is less than a pre-established maximum value, the motors are commanded to travel along the first segment at the pre-established nominal speed and are then commanded to travel along the second segment at the pre-established nominal speed. If the difference is greater than the maximum value, the motors are commanded to travel along the first segment at the pre-established nominal speed until they almost reach the end of the first segment, and then slow down to a pre-established minimum speed, reach the point of conjunction between the two segments at said minimum speed and then accelerate again to follow the second segment and travel along it at the nominal speed pre-established for it.

20 Claims, 2 Drawing Sheets

METHOD AND APPARATUS FOR CONTROLLING THE MOVEMENT OF A TOOL

BACKGROUND OF THE INVENTION

This invention refers to an innovative method of control for a numerical control machining apparatus, for example of the type with three cartesian axes described in the Italian patent application MI92A000491 on behalf of the same Applicant.

The problems caused by sudden sharp changes of direction in automatic precision control mechanisms, such as numerical control machining apparatuses, are well known. Inertia of the masses in movement prevents excessively sharp changes due both to the considerable stress transmitted to the mechanical parts and to the possible loss of control of the movement.

For example, as is well-known to the expert, stepper motors are often advantageously used in similar applications, thanks to the low cost of the necessary electronic control equipment and to its intrinsic characteristics. Conversely, these motors cannot be subjected to sharp changes in the speed of rotation, or of the control pulse period. In fact, an excessively rapid change gives rise to an inevitable loss of pitch, that is to say, the angular position assumed by the motor becomes indistinct, with obvious consequences as regards the accuracy of the controlled movement.

Especially in cartesian-axis machining apparatuses, such as the one described in the aforementioned application, each change of direction of the tool is a potential source of problems, due to the fact that each movement in the cartesian space is made up of a combination of movements along the three cartesian axes, each of which is controlled by its respective motor.

Sharp-cornered points along the path of movement therefore give rise to sharp changes in the speed ratios between the three motors. The problem is usually avoided by slowing down the motors along pre-established ramps, in the vicinity of each change of path of the tool, for example until they come to a standstill, and then gradually re-accelerate to the normal machining speed after having passed the point of change of direction, thereby ensuring that the changes in speed of the individual motors remain within a given safety limit.

This method of proceeding however results in a slow down of the production process, since the average speed of movement of the tool depends upon the number of changes in direction. Moreover, it has been observed that in machining operations on materials such as wood, the speed of movement of the tool is an extremely important parameter for the surface finish of the area subjected to the action of the tool itself. Consequently it is preferable to keep speed variations along the path to a minimum.

SUMMARY OF THE INVENTION

The general scope of this invention is to obviate the aforementioned problems by providing a method for controlling motors, in particular stepper motors, in an automated machine tool, which tends to minimize the changes in speed of the tool along its path, thereby permitting a faster and smoother production process, and at the same time without causing excessive stress to the mechanical parts or giving rise to problems of loss of position.

This scope is achieved by providing a method, according to the invention, for controlling motors for moving a tool along a pre-established path which comprises a plurality of path segments sequential to one another, comprising a control cycle with the steps of:

calculating first parameters indicating the speed to be imparted to the motors to travel at a pre-established nominal speed along a first segment of a sequential pair of path segments, calculating second parameters indicating the speed to be imparted to the motors to travel at a pre-established nominal speed along a second segment of the sequential pair of path segments, calculating the absolute value of the difference between the first and second parameters and ascertaining whether said difference is greater than a pre-established maximum value, if the difference is less than the pre-established maximum value: commanding the motors to travel along the first segment at the nominal speed pre-established for it and then, from the point of conjunction between the two segments, commanding the motors to travel along the second segment at the nominal speed pre-established for it, if the difference is greater than the maximum value: commanding the motors to travel along the first segment at the nominal speed pre-established for it, slowing down the speed of the motors close to the end of the first segment to a pre-established minimum speed, reaching the point of conjunction between the two segments at such minimum speed and then accelerating the motors again to travel along the second segment at the nominal speed pre-established for it.

The method advantageously comprises the further steps of calculating a third parameter indicating the length of the second segment before beginning to travel along said segment; comparing said third parameter with a pre-established minimum value and, whenever the third parameter is less than said minimum value, slowing down the speed of the motors close to the end of the first segment to a pre-established minimum speed, reaching the point of conjunction between the two segments at such minimum speed and then accelerating the motors again to travel along the second segment.

The scope is further achieved by providing a numerical control machining apparatus, according to the aforesaid method, with motors for moving a tool along a pre-established path which comprises a plurality of path segments sequential to one another, characterized by the fact of comprising:

calculating means for calculating first parameters indicating the speed to impart to the motors to travel at a pre-established nominal speed along a first path segment, calculating means for calculating second parameters indicating the speed to impart to the motors to travel at a pre-established nominal speed along a second path segment sequential to the first segment, calculating means for calculating the absolute value of the difference between the first and second parameters, comparing means for comparing said absolute value with a pre-established maximum value which, if the difference is less than the pre-established maximum value, emit signals to command the motors to travel along the first segment at the nominal speed pre-established for it and then, from the point of conjunction between the two segments, emit signals to command the motors to travel along the second segment at the nominal speed pre-established for it, if the difference is greater than the pre-established maximum value, the comparing means emitting signals to command the motors to travel along the first segment at the nominal speed pre-established for it, reduce speed close to the end of the first segment to a pre-established minimum speed, arrive at the point of conjunction between the two segments at said minimum speed and then accelerate the motors again to travel along the second segment at the nominal speed pre-established for it.

The innovatory principles of this invention and its advantages compared to the known technique will be more clearly evident from the following description of a possible exemplificative embodiment applying such principles, with reference to the accompanying drawings.

DETAILED DESCRIPTION OF THE INVENTION

Figure 1:
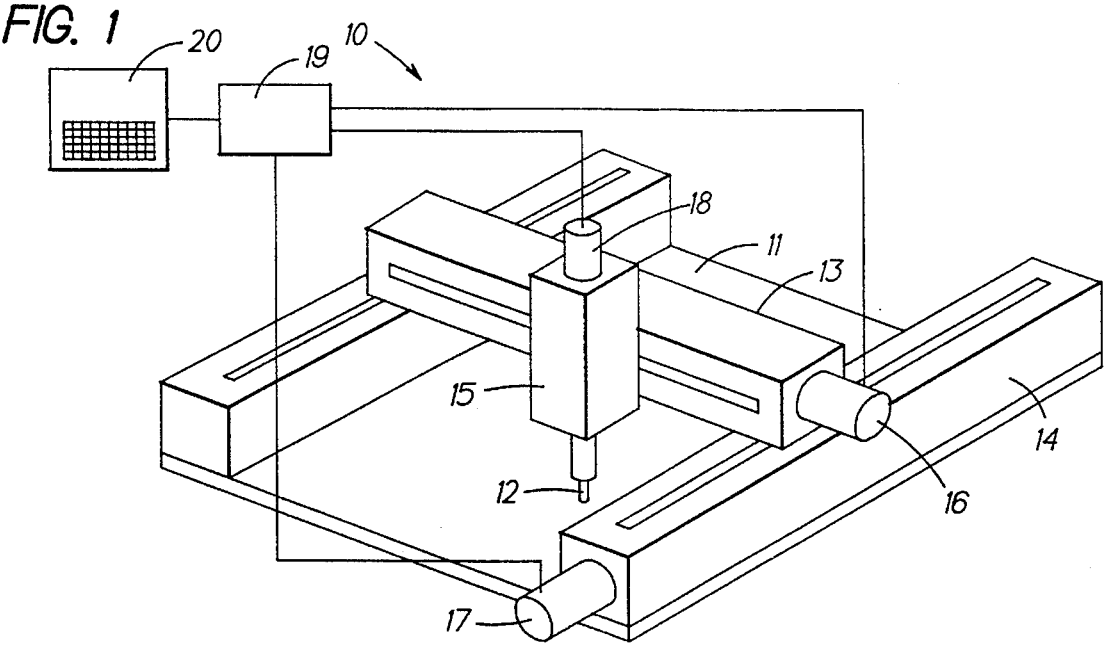
FIG. 1 shows an exemplificative schematic view of a numerical control machine tool.

With reference to the figures, FIG. 1 shows a schematic view of a possible automatic machine tool or apparatus advantageously controlled according to the method described herein.

Said machine, which is generically indicated by reference 10, comprises a work surface 11, along which a tool 12 is made to move by means of cartesian guides 13, 14, 15 actuated by corresponding motors 16, 17, 18. The movement is controlled by a device 19, obtained for example by means of a known microprocessor circuit suitably programmed to follow pre-established paths with the tool, which are programmed for example by means of a keyboard 20. The numerical control machine can be easily imagined by the expert in the field and is therefore not further described or shown herein. For example, the machine described in the aforementioned Italian patent application MI92A000491 can be advantageously used.

As will be more clearly evident further on, the microprocessor device embodies means for calculating the motor speed parameters in relation to the results of the comparison according to the flow diagrams described hereunder.

Figure 3:
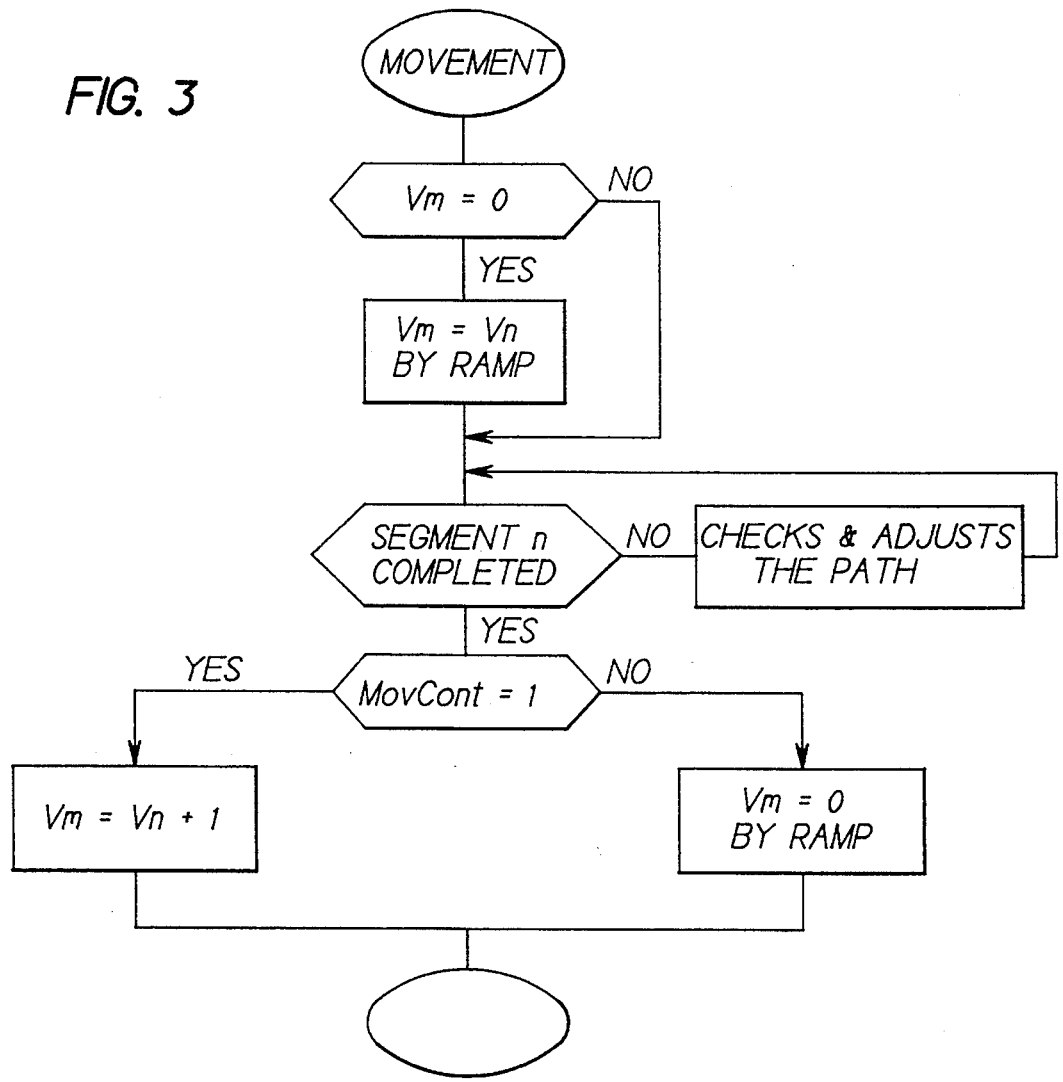
FIG. 3 shows a block diagram of a second portion of the control flow of FIG. 2.
Figure 2:
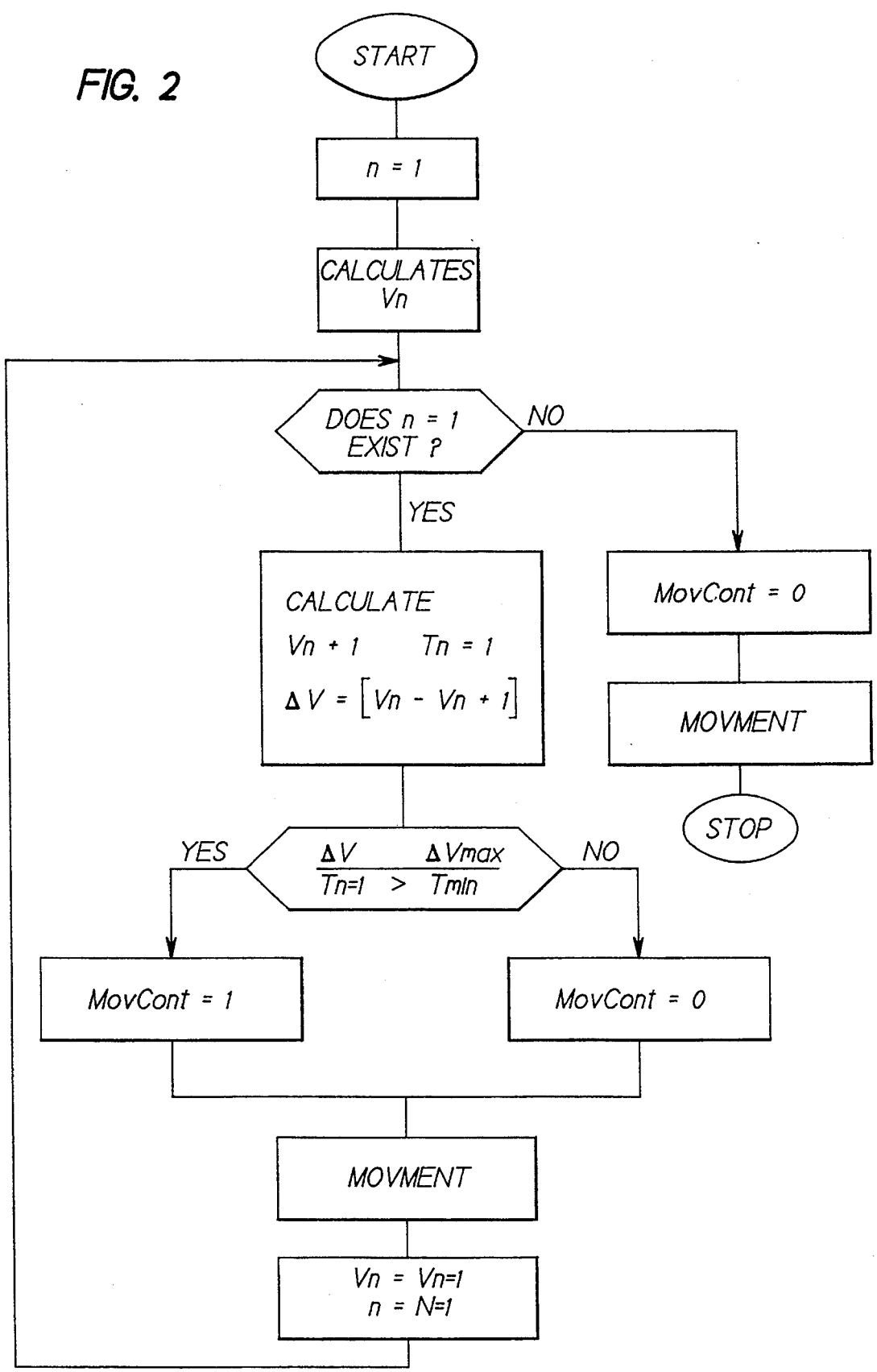
FIG. 2 shows a block diagram of a first portion of the control flow of the machine according to the invention.

FIGS. 2 and 3 show control flows obtained according to the innovatory principles claimed herein, to accomplish a pre-established path composed of a plurality of segments (for example, straight line segments) sequential to one another.

When the machine is set in motion, the microprocessor initially positions the tool at the starting point of the path and calculates the speeds Vn at which the motors must run for the tool to travel along the first segment of the path (or segment n=1) at the nominal operating speed.

V is substantially a vector of the speeds of the motors according to the cartesian axes; for example, in the case of three axes it will be composed of the scalars Vx, Vy, Vz. Further on, for the sake of simplicity, the speeds of the motors will be indicated as the controlled parameters, even though any magnitude proportional to the speeds may be used in the calculations. For example, in the case of stepper motors, the controlled magnitude can be the period between the control pulses.

The microprocessor subsequently ascertains whether the current segment n is the last one or whether there is a further segment n+1. If there is a further segment, a calculation is made of the speeds Vn+1 that the motors must generate to enable the tool to continue along said segment n+1 at the nominal speed when it comes to the end of the current segment n. For reasons that will be clarified further on, a calculation is also advantageously made of a parameter Tn+1, indicating the length or length of time of the segment n+1.

A calculation is then made of the variation in the speeds of the motors when changing from segment n to segment n+1, and namely V=|Vn−Vn+1|.

According to the principles claimed herein, whenever the change of speed of each motor involved in the movement is above a pre-established limit Vmax the changeover between segments n and n+1 is effected by slowing down or stopping the motors at the point of change and then accelerating them again, as is the normal procedure for the known technique. If, on the contrary, the V is lower than the Vmax limit, the changeover between the segments is effected by suddenly changing the speeds of the motors between the values Vn and Vn+1 at the point of transition between the two segments.

The Vmax limit values will depend upon the mechanical and electrical characteristics of the machine and can be calculated accurately on the basis, for example, of the data supplied by the manufacturer of the motors in relation to the loads to be moved. For example, in the embodiment of this invention, it has been found that the maximum permissible variation can be in the region of 10%. Obviously, instead of one limit valid for all the axes, it is also possible to establish different limits for each axis, according to the particular characteristics of such axis.

FIGS. 2 and 3, by way of example, show a possible schematic implementation of the above-described method of transition between two segments. As can be seen in FIG. 2, on reaching the block of comparison between the speed variation to be accomplished and the acceptable speed variation, if the comparison is positive a variable or MOVCONT=1 flag is programmed, that is to say it is possible to effect the transition between the two segments n and n+1 with a continuous movement. If, on the contrary, the comparison is negative, a MOVCONT=0 is programmed, that is to say it is not possible to effect the transition between the two segments n and n+1 with a continuous movement.

Next comes a movement control block, indicated by MOVEMENT in FIG. 2, which effects the movement programmed with reference to MOVCONT. The next segment consequently becomes the new current segment, assigning Vn=Vn+1, and n=n+1, and the procedure described above can consequently be repeated with reference to the transition between the new current segment n and its subsequent segment n+1. The cycle of calculating the transitions, effecting them and passing on to the next segment continues until the check for the existence of a subsequent segment n+1 gives a negative result, that is to say when the last segment is reached. In this case, the MOVCONT variable is set to zero, so that the movement control block effects the movement along the last segment and, on completion of the latter, stops the motors completely.

FIG. 3 shows a possible block diagram of the MOVEMENT block of FIG. 2, for example made in the form of a subprogramme. As can be seen in FIG. 3, first it is ascertained whether the motors are stationary, that is to say whether their speed Vm=0. If the motors are stationary (for example because the first segment has to be effected or because it was not possible to effect a continuous movement at the end of the previous segment), they are brought up to the speeds Vn according to a pre-established acceleration ramp (according to their electrical and mechanical characteristics, as is known to the expert in the field). The tool thus travels along the segment n. A check is then made to ascertain whether the end of the segment n is reached. If necessary, whenever the check does not give a positive result, a check can be advantageously carried out in order to ascertain whether the actual position of the tool effectively corresponds to the calculated theoretical position, that is to say whether the tool is accurately following the path along segment n, and make any necessary adjustments. This can be advantageously achieved whenever position encoders are provided on the driving axles. The control device can thus cyclically detect the effective position of the tool by means of the encoders and compare it with the coordinates calculated for the segment When the end of the segment is reached, a check is made to ascertain whether the MOVCON variable indicates whether it is possible or not possible to effect a continuous movement between the segment just completed and the next one. If MOVCON=1, the speed of the motors is changed abruptly to the speed Vn+1 previously calculated for the segment n+1, thereby enabling the tool to begin travelling along said segment. If MOVCON=0, the speed of the motors is slowed down to zero by means of a previously calculated braking ramp.

At this point it will be clear how it has been possible to optimize the transition between the different segments making up a path to be followed with a motor-driven tool. The programme flow shown herein is provided merely to give clearer understanding of the innovative principles claimed herein and should not therefore be understood as a limitation to the sphere of protection. Once the innovatory principles of the invention have been fully understood, the expert technician can immediately draw up complete control programme applying such principles.

For example, controlling the movement of the motors, and checking that the tool has travelled along the entire length of a segment and that the calculated path corresponds to the effective position, can be advantageously carried out by means of "interrupts" at pre-established intervals, for example by means of a system timer, so as to keep continuous and close control of the movement, as is known in the field.

Returning to FIG. 2, the function remaining to be described is that of the third parameter or Tn+1 value, which represents the length or length of time of the segment n+1. As can be seen in FIG. 2, the comparison which leads to decide whether it is possible or not possible to effect the continuous movement between the segments also includes a check as to whether T is greater than a pre-established Tmin value. The Tmin value is a pre-established minimum value representing the minimum length of a segment so that it is possible, when travelling along the latter, to effect a deceleration ramp from the maximum value to the minimum value Vm=0.

This check is necessary to ensure that, whenever it is subsequently not possible to effect the continuous movement between the current segment n+1 and the next segment, it is possible to effect the deceleration ramp to reduce the speed to minimum and thus effect the non-continuous movement (MOVCON=0). Tmin obviously depends upon the electromechanical characteristics of the system and will therefore in practice be programmed according to the particular machine.

In the example shown in FIG. 2, this is all achieved by simply putting MOVCONT=0, both in the case of VVmax, as well as in the case of Tn+1Tmin. In this way, if it is found that the segment n+1 is too short for the pre-established ramp, the tool will drop to minimum speed (for example VM=0 ) after having travelled along the segment n, so that the system can accelerate again and if necessary decelerate (even without having reached nominal speed) without problems while the tool is travelling along segment n+1.

At this point it will be clear that the intended scopes have been achieved by providing a movement control method which minimizes the speed variations along the path at sharp-angled points, thereby reducing processing times and ensuring excellent results in the surface finish of materials such as wood.

The foregoing description of an embodiment applying the innovatory principles of this invention is obviously given by way of example in order to illustrate such innovatory principles and should not therefore be understood as a limitation to the sphere of the invention claimed herein.

For example, whenever the movement along one of the axes is particularly limited compared to the movements of the other two axes (such as for example in the machine shown in FIG. 1 for the axis Z), the continuous movement between the segments can involve just these two axes, the movement of the third axis being disabled to effect continuous movements.

Even though, for the sake of simplicity, reference has been made to the complete stoppage of the motor between two consecutive segments whenever it is not possible to effect a continuous movement, it is also possible to imagine that the motors can simply be slowed down to a pre-established minimum value in correspondence with the end of the first segment, and then accelerate again from said value to the normal working speed along the subsequent segment.

I claim:

1. A method of controlling stepper motors for moving a tool along a pre-established plurality of sequential path segments, comprising the steps of:

calculating first parameters representing the period of the pulse to be imparted to the stepper motors to travel at a pre-established nominal speed along a first segment of a sequential pair of path segments;

calculating second parameters representing the period of the pulse to be imparted to the stepper motors to travel at a pre-established nominal speed along a second segment of the sequential path segments;

calculating an absolute value of the difference between said first and second parameters;

comparing said absolute value of the difference with a pre-established maximum value;

wherein said pre-established maximum value represents the maximum permissible change of speed in the stepper motors;

such that, if said absolute value of the difference is less than said pre-established maximum value, commanding the stepper motors to travel along said first segment at the nominal speed pre-established for said first segment and then, from the point of transition between said two segments, commanding the stepper motors to travel along the second segment at the nominal speed pre-established for said second segment; and such that, if said absolute value of the difference is greater than said pre-established maximum value, commanding the stepper motors to travel along said first segment at said nominal speed pre-established for said first segment, slowing down the speed of the stepper motors close to the end of said first segment to a pre-established minimum speed, reaching the point of transition between said first and second segments at said minimum speed and then accelerating the stepper motors to travel along said second segment at said nominal speed preestablished for said second segment.

2. A method as claimed in claim 1 further comprising the steps of:

calculating a third parameter indicating the length of said second segment before beginning to travel along said second segment; and comparing said third parameter with a pre-established minimum value and, in the event of the third parameter being smaller than said minimum value slowing down the speed of the stepper motors close to the end of said first segment to a pre-established minimum speed to reach the point of transition between said first and second segments at said minimum speed and then accelerating the stepper motors again to travel along the second segment.

3. A method as claimed in claim 2, wherein said pre-established minimum value represents the minimum length of said segment in which deceleration from said nominal speed to said pre-established minimum speed can be effected.

4. A method as claimed in claim 1 wherein said pre-established minimum speed is zero.

5. A method as claimed in claim 1, wherein said second segment and the segment sequential thereto are used respectively as said first and said second segments of a subsequent iteration of said method.

6. A method as claimed in claim 5, wherein said second parameters are calculated during the travel along said first segment.

7. A method of controlling motors for moving a tool along a pre-established plurality of sequential path segments, comprising the steps of:

calculating first parameters indicating the speed imparted to the motors to travel at a pre-established nominal speed along a first segment of a sequential pair of path segments;

calculating second parameters indicating the speed to be imparted to the motors to travel at a pre-established nominal speed along a second segment of the sequential path segments;

calculating an absolute value of the difference between said first and second parameters;

comparing said absolute value of the difference with a pre-established maximum value;

wherein said pre-established maximum value represents the maximum permissible change of speed in the motors;

such that, if said absolute value of the difference is less than said pre-established maximum value, commanding the motors to travel along said first segment at the nominal speed pre-established for said first segment and then, from the point of transition between said two segments, commanding the motors to travel along the second segment at the nominal speed pre-established for said second segment;

such that, if said absolute value of the difference is greater than said pre-established maximum value, commanding the motors to travel along said first segment at said nominal speed pre-established for said first segment, slowing down the speed of the motors close to the end of said first segment to a pre-established minimum speed, reaching the point of transition between said first and second segments at said minimum speed and then accelerating the motors to travel along said second segment at said nominal speed pre-established for said second segment;

calculating a third parameter indicating the length of said second segment before beginning to travel along said second segment; and comparing said third parameter with a pre-established minimum value and, in the event of the third parameter being smaller than said minimum value slowing down the speed of the motors close to the end of said first segment to a pre-established minimum speed to reach the point of transition between said first and second segments at said minimum speed and then accelerating the motors again to travel along the second segment.

8. A method as claimed in claim 7, wherein said first and second parameters represent the period of the pulses for controlling stepper motors.

9. A method as claimed in claim 8, wherein said pre-established minimum value represents the minimum length of said segment in which deceleration from said nominal speed to said pre-established minimum speed can be effected.

10. A method as claimed in claim 7, wherein said first and second parameters are magnitudes proportional to speed vectors of the motors along at least two cartesian axes.

11. An apparatus for controlling stepper motors for moving a tool along a pre-established plurality of sequential path segments, comprising:

calculating means for calculating first parameters representing the period of the pulse to be imparted to the stepper motors to travel at a pre-established nominal speed along a first segment of a sequential pair of path segments;

calculating means for calculating second parameters representing the period of the pulse to be imparted to the stepper motors to travel at a pre-established nominal speed along a second segment of the sequential path segments;

calculating means for calculating an absolute value of the difference between said first and second parameters;

comparing means for comparing said absolute value of the difference with a pre-established maximum value;

wherein said pre-established maximum value represents the maximum permissible change of speed in the stepper motors;

such that, if said absolute value of the difference is less than said pre-established maximum value, said comparing means commanding the stepper motors to travel along said first segment at the nominal speed pre-established for said first segment and then, from the point of transition between said two segments, commanding the stepper motors to travel along the second segment at the nominal speed pre-established for said second segment; and such that, if said absolute value of the difference is greater than said pre-established maximum value, said comparing means commanding the stepper motors to travel along said first segment at said nominal speed pre-established for said first segment, slowing down the speed of the stepper motors close to the end of said first segment to a pre-established minimum speed, reaching the point of transition between said first and second segments at said minimum speed and then accelerating the stepper motors to travel along said second segment at said nominal speed pre-established for said second segment.

12. An apparatus as claimed in claim 11 further comprising:

calculating means for calculating a third parameter indicating the length of said second segment before beginning to travel along said second segment; and comparing means for comparing said third parameter with a pre-established minimum value and, in the event of the third parameter being smaller than said minimum value slowing down the speed of the stepper motors close to the end of said first segment to a pre-established minimum speed to reach the point of transition between said first and second segments at said minimum speed and then accelerating the stepper motors again to travel along the second segment.

13. An apparatus as claimed in claim 12, wherein said pre-established minimum value represents the minimum length of said segment in which deceleration from said nominal speed to said pre-established minimum speed can be effected.

14. An apparatus as claimed in claim 12 wherein said pre-established minimum speed is zero.

15. An apparatus as claimed in claim 12, wherein said second segment and the segment sequential thereto are used respectively as said first and said second segments of a subsequent iteration when using said apparatus.

16. An apparatus as claimed in claim 15, wherein said second parameters are calculated during the travel along said first segment.

17. An apparatus for controlling motors for moving a tool along a pre-established plurality of sequential path segments, comprising:

calculating means for calculating first parameters indicating the speed imparted to the motors to travel at a pre-established nominal speed along a first segment of a sequential pair of path segments;

calculating means for calculating second parameters indicating the speed to be imparted to the motors to travel at a pre-established nominal speed along a second segment of the sequential path segments;

calculating means for calculating an absolute value of the difference between said first and second parameters;

comparing means for comparing said absolute value of the difference with a pre-established maximum value;

wherein said pre-established maximum value represents the maximum permissible change of speed in the motors;

such that, if said absolute value of the difference is less than said pre-established maximum value, said comparing means commanding the motors to travel along said first segment at the nominal speed pre-established for said first segment and then, from the point of transition between said two segments, commanding the motors to travel along the second segment at the nominal speed pre-established for said second segment;

such that, if said absolute value of the difference is greater than said pre-established maximum value, said comparing means commanding the motors to travel along said first segment at said nominal speed pre-established for said first segment, slowing down the speed of the motors close to the end of said first segment to a pre-established minimum speed, reaching the point of transition between said first and second segments at said minimum speed and then accelerating the motors to travel along said second segment at said nominal speed pre-established for said second segment;

calculating means for calculating a third parameter indicating the length of said second segment before beginning to travel along said second segment; and comparing means for comparing said third parameter with a pre-established minimum value and, in the event of the third parameter being smaller than said minimum value slowing down the speed of the motors close to the end of said first segment to a pre-established minimum speed to reach the point of transition between said first and second segments at said minimum speed and then accelerating the motors again to travel along the second segment.

18. An apparatus as claimed in claim 17, wherein said first and second parameters represent the period of the pulses for controlling stepper motors.

19. An apparatus as claimed in claim 18, wherein said pre-established minimum value represents the minimum length of said segment in which deceleration from said nominal speed to said pre-established minimum speed can be effected.

20. An apparatus as claimed in claim 17, wherein said first and second parameters are magnitudes proportional to speed vectors of the motors along at least two cartesian axes.

* * * * *